June 9, 1942. W. C. TURNER 2,285,629
SHOVEL
Filed March 25, 1940
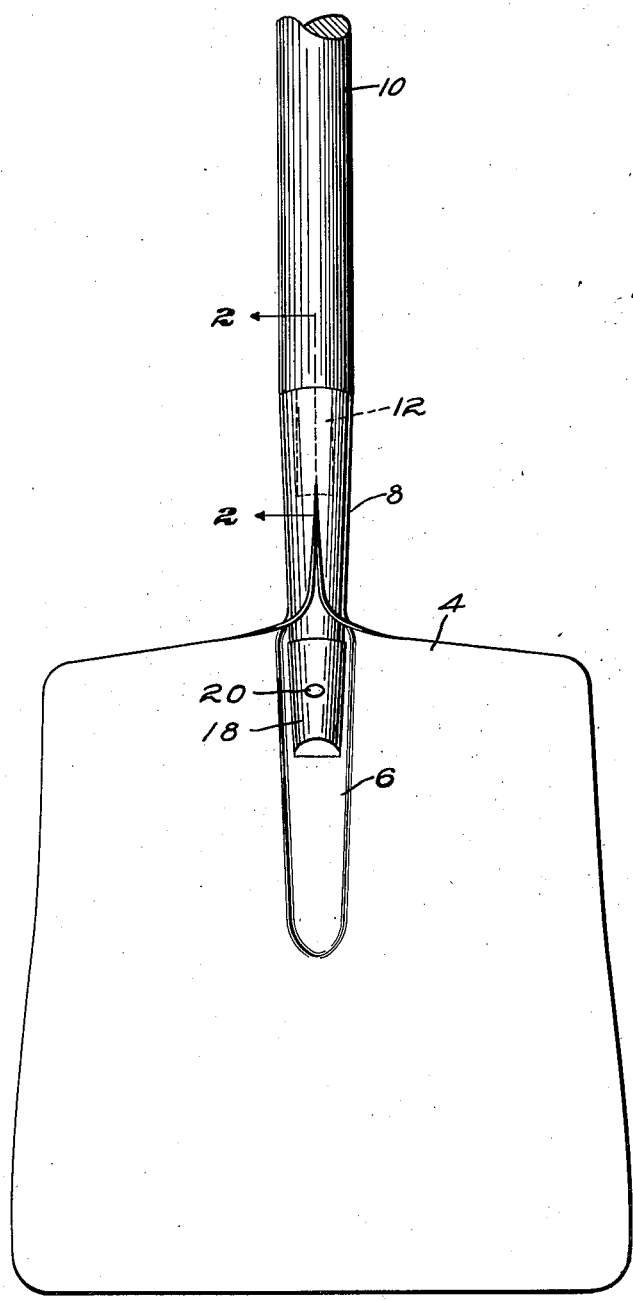
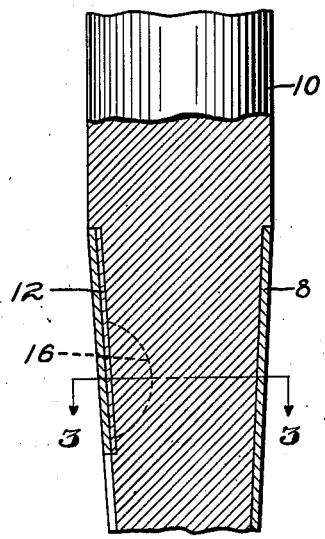
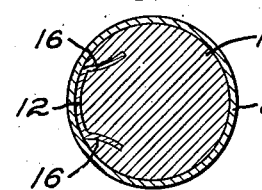
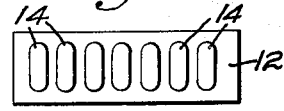
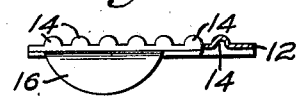
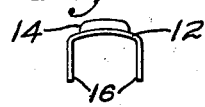
Inventor:
Winthrop C. Turner,
by Emery, Booth, Townsend, Miller & Wedger
Attys.

Patented June 9, 1942

2,285,629

UNITED STATES PATENT OFFICE 2,285,629

SHOVEL

Winthrop C. Turner, Parkersburg, W. Va., assignor to Ames Baldwin Wyoming Co., Parkersburg, W. Va., a corporation of Delaware Application March 25, 1940, Serial No. 325,777

7 Claims. (Cl. 306—21)

This invention relates to shovels and like tools having a blade or head and a handle, and the object is to provide an improved construction for securing the handle to the blade. The invention applies more particularly to shovels having a handle receiving socket at the rear thereof, at least the distal portion of which is a circumferentially continuous tube, and provides an interior or blind anchoring means adjacent such end so that the upper end of the socket which is engaged by the grasping hand may present a smooth surface.

My invention will be well understood by reference to the following description of the illustrative embodiment thereof shown by way of example in the accompanying drawing, wherein:

Fig. 1 is a rear view of the lower portion of a shovel;

Fig. 2 is a fragmentary view on an enlarged scale at the upper end of the socket of the blade and is partly in section on the line 2—2 of Fig. 1;

Fig. 3 is a section on the line 3—3 of Fig. 2; and

Figs. 4, 5 and 6 are a plan, a side elevation and an end elevation, respectively, of an element used in the construction.

My invention is applicable to shovels of the hollow back type and I have illustrated such a shovel in the accompanying drawing by way of example. I have therein shown a shovel blade 4 having a forwardly expressed reinforcing frog 6 at its rear edge, the wall of which merges into a central extension 8 from the rear of the blade, which extension is curled over into tubular form to form a socket for the reception of the customary wooden handle 10. This is the well known "hollow back" construction. The handle is fitted into the socket and its lower end extends terminally into the frog 6.

In the construction shown the distal end of the socket is formed into a circumferentially continuous tube, and I take advantage of this to provide in accordance with my invention means disposed interiorly of the socket for contributing to the security of the handle fastening. In Figs. 4, 5 and 6 I have shown a metal plate having a web 12 provided with embossed projections 14 and at either side flanges 16, preferably of the rounded shape shown. This plate is assembled with the socket, spanning the opposed edges thereof at the interior and electrically welded into position, the embossed projections 14 being designed to facilitate the action by forming localized areas which under the action of the electric current weld to the sides of the socket so that the web of the plate joins the edges of the socket together. When this joinder is effected, the flanges 16 project within the socket as transversely thin fins longitudinally disposed therein, that is, extending in the general direction of the axis.

The handle 10 is forced into the socket, the lower end of the handle, in the case of a shovel having a hollow frog such as that shown, usually extending into the frog. Because of their form and disposition the fins 16 are not bent over in this operation but cut into the wood and engage the handle shaft in the manner of splines, while permitting the handle to be forced home. The end of the handle may be tapered so that its terminal end is of smaller circumference than the end of the socket. Because of this and because each spline extends non-radially, there being two herein on opposite sides of and initially substantially parallel to a central fore and aft plane, a lateral reaction is set up which causes the fins 16 to be curled over or upset more or less in the manner of clinch nails, as best illustrated in Fig. 3, this contributing to their effective grip on the handle since they then in part overhang or oppose the socket wall and also they would have to be rebent to effect their withdrawal through the path by which they entered along the length of the handle. In the annexed claims in referring to the fins as entering the handle or imbedded therein I refer to a tight frictional engagement such as characteristically results from driving a penetrating fastening into wood with a cutting into or wedging apart of the fibrous structure.

While the engagement of the fins, particularly when upset in the manner described, provides a substantial resistance to withdrawal of the handle from its socket, I prefer not to rely on this but to secure retention of the handle by other means cooperating with the inner end thereof. In the case of the hollow back shovel illustrated wherein the end of the handle enters the frog, this is conveniently effected by attaching the terminal end of the handle to the wall of the frog. I have herein shown the end of the handle covered by a reinforcing plate 18 through which and through the frog extends a rivet 20 as in the so-called "rivetless socket" shovels, so called because, as in the present case, there are no rivets transverse to the socket 8 itself, the exterior of which socket is smooth and free from asperities.

The fins 16 embedded in the handle position the same as against rotative strains such as might arise more particularly if there were any shrinkage of the wood, keep the handle firm, and to a great extent relieve the rivet 20 of the duty of maintaining the plane of the blade.

It will be seen that in the case of such a shovel as that illustrated, in which the handle socket is not in itself circumferentially continuous, the fins 16 may be added as an incident to welding up the socket into tubular form. They do not interfere with the smooth exterior contour of the socket in the finished shovel, nor in assembling the blade and handle do they in any way tend to mar the finish previously given to the exposed surfaces of those parts.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A shovel of the hollow back type comprising a blade having a frog and a socket extending rearwardly in line therewith presenting opposed edges, a plate within the socket at the distal end thereof bridging said edges and welded thereto to provide a circumferentially continuous tubular portion at the distal end of the socket, said plate having an inwardly projecting, longitudinally disposed fin and a non-metallic handle tightly fitting the tubular portion and into which said fin extends in the manner of a spline, the handle extending into the frog and secured against withdrawal by a securing device attaching the handle end to the wall of the frog.

2. A shovel of the hollow back type comprising a blade having a forwardly expressed frog at the rear and a rearward extension in line with the frog distally formed as a circumferentially continuous tube, the outer wall of said tube being free of projections or asperities, the inner wall at the distal end having a longitudinally extending fin and a non-metallic handle tightly fitting the tube and into which said fin extends in the manner of a spline, the handle extending into the frog and secured against withdrawal by a securing device attaching the handle end to the wall of the frog.

3. A shovel or like tool having a blade from which extends rearwardly a socket at least the distal portion of which forms a circumferentially continuous tube and is free of exterior projections or asperities, a non-metallic handle extending into the socket, means associated with the continuous distal portion of the socket and received entirely within the same providing a fin of slight width and considerable longitudinal extent entering the handle in the manner of a spline, and means engaging the terminal portion of the handle to secure the handle against axial withdrawal.

4. A shovel or like tool having a blade from which extends rearwardly a socket at least the distal portion of which forms a circumferentially continuous tube, a non-metallic handle extending into the socket, a fin of slight width and considerable longitudinal extent carried by the inner wall of the continuous portion of the socket driven longitudinally into the handle and laterally clinched within the same in opposition to the socket wall.

5. A shovel or like tool having a blade from which extends rearwardly a socket at least the distal portion of which forms a circumferentially continuous tube, a non-metallic handle extending into the socket, a member welded to the interior of the socket having a fin of slight width and considerable longitudinal extent, which is disposed adjacent the distal end thereof and embedded in the handle.

6. A shovel or like tool having a blade from which extends rearwardly a socket at least the distal portion of which forms a circumferentially continuous tube, a non-metallic handle extending into the socket, a member welded to the interior of the continuous portion of the socket having a non-radial fin of slight width and considerable longitudinal extent, which is disposed adjacent the distal end thereof and embedded in the handle.

7. A shovel or like tool having a blade from which extends rearwardly a socket at least the distal portion of which forms a circumferentially continuous tube, a non-metallic handle extending into the socket, a member welded to the interior of the socket having a pair of fins of slight width and considerable longitudinal extent projecting inwardly from the wall of the continuous portion of the socket at opposite sides of a fore and aft plane, which fins are driven longitudinally into the handle and laterally clinched within the same in opposition to the socket wall.

WINTHROP C. TURNER.